US011140220B1

(12) United States Patent
Coleman et al.

(10) Patent No.: US 11,140,220 B1
(45) Date of Patent: Oct. 5, 2021

(54) CONSISTENT HASHING USING THE POWER OF K CHOICES IN SERVER PLACEMENT

(71) Applicant: Amazon Technologies, Inc., Seattle, WA (US)

(72) Inventors: Benjamin Ray Coleman, Houston, TX (US); Anshumali Shrivastava, Houston, TX (US); Aravind Srinivasan, Ellicott City, MD (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/119,835

(22) Filed: Dec. 11, 2020

(51) Int. Cl.
*G06F 15/173* (2006.01)
*H04L 29/08* (2006.01)

(52) U.S. Cl.
CPC ...... *H04L 67/1023* (2013.01); *H04L 67/1029* (2013.01); *H04L 67/1031* (2013.01); *H04L 67/1038* (2013.01)

(58) Field of Classification Search
CPC ............ H04L 67/1023; H04L 67/1029; H04L 67/1031; H04L 67/1038
USPC ....................................................... 709/223
See application file for complete search history.

(56) References Cited

U.S. PATENT DOCUMENTS

| | | | | |
|---|---|---|---|---|
| 8,650,156 B1 * | 2/2014 | McHugh | ............... | G06F 12/12 707/638 |
| 8,849,825 B1 * | 9/2014 | McHugh | ............. | G06F 16/2255 707/737 |
| 8,972,366 B2 * | 3/2015 | Darcy | .................. | G06F 16/137 707/698 |
| 9,053,054 B1 * | 6/2015 | McHugh | ................. | G06F 12/12 |
| 9,235,623 B2 * | 1/2016 | Moyne | ............. | G06F 16/24554 |
| 9,298,732 B2 * | 3/2016 | Darcy | .................. | G06F 16/134 |
| 9,367,600 B2 * | 6/2016 | Moyne | ............. | G06F 16/24554 |
| 9,432,245 B1 * | 8/2016 | Sorenson, III | ........ | H04L 47/125 |
| 9,553,809 B2 * | 1/2017 | Sorenson, III | .......... | H04L 47/10 |
| 9,559,961 B1 * | 1/2017 | Sorenson, III | .......... | H04L 43/00 |
| 9,639,571 B2 * | 5/2017 | Weisberg | ............ | G06F 16/2379 |
| 9,838,482 B1 * | 12/2017 | Hardy | ................... | H04L 67/141 |
| 9,871,855 B2 * | 1/2018 | Likhtarov | ........... | H04L 67/1008 |
| 9,875,262 B2 * | 1/2018 | McHugh | ............... | G06F 16/219 |

(Continued)

OTHER PUBLICATIONS

Azar et al., Balanced Allocations, STOC '94: Proceedings of the twenty-sixth annual ACM symposium on Theory of Computing, 1994, pp. 1-30.

(Continued)

*Primary Examiner* — Alicia Baturay
(74) *Attorney, Agent, or Firm* — Knobbe, Martens, Olson & Bear, LLP

(57) ABSTRACT

Systems and methods are described for load balancing requests in a distributed system using consistent hashing. Specifically, systems and methods are described for using "the power of k choices" when placing new servers on a consistent hash ring used to load balance requests. Rather than placing each new server at a fixed point determined by a hashing algorithm, a load balancer can identify multiple potential points on the hash ring for the new server. The load balancer can then compare these points to determine a preferred location, and place the server at the preferred location. Techniques described herein can substantially improve placement of servers, which in turn results in better load balancing.

20 Claims, 6 Drawing Sheets

(56) References Cited

U.S. PATENT DOCUMENTS

| | | | | |
|---|---|---|---|---|
| 10,038,626 B2* | 7/2018 | Sorenson, III | ...... | H04L 43/0817 |
| 10,069,903 B2* | 9/2018 | Sorenson, III | ...... | H04L 67/1038 |
| 10,091,098 B1* | 10/2018 | Lorenz | ................. | H04L 43/062 |
| 10,176,069 B2* | 1/2019 | Borah | ................. | G06F 11/3409 |
| 10,187,249 B2* | 1/2019 | Borah | ................. | H04L 41/5009 |
| 10,320,683 B2* | 6/2019 | Pfister | ................. | H04L 47/125 |
| 10,528,537 B2* | 1/2020 | McHugh | ............... | G06F 16/182 |
| 10,541,909 B2* | 1/2020 | Lorenz | ................. | H04L 43/062 |
| 10,673,764 B2* | 6/2020 | Lorenz | ................. | H04L 47/125 |
| 10,680,955 B2* | 6/2020 | Pfister | ................. | H04L 67/1008 |
| 10,855,580 B2* | 12/2020 | Rashad | ................ | H04L 45/42 |
| 10,917,351 B2* | 2/2021 | Pfister | ................. | H04L 47/125 |
| 10,929,401 B2* | 2/2021 | Moyne | ............... | G06F 16/1824 |
| 10,938,668 B1* | 3/2021 | Zulak | ..................... | H04L 67/34 |
| 10,942,795 B1* | 3/2021 | Yanacek | ................ | G06F 9/547 |
| 10,944,655 B2* | 3/2021 | Borah | ................. | G06F 11/3495 |
| 2015/0186187 A1* | 7/2015 | Weisberg | ............. | G06F 16/278 |
| | | | | 707/747 |
| 2016/0087880 A1* | 3/2016 | Shalita | ............... | H04L 67/1021 |
| | | | | 709/215 |
| 2016/0105502 A1* | 4/2016 | Shen | ................. | H04L 67/1063 |
| | | | | 709/205 |
| 2016/0266944 A1* | 9/2016 | Hsieh | ..................... | G06F 9/546 |
| 2016/0269480 A1* | 9/2016 | Hsieh | ..................... | G06F 9/546 |
| 2016/0378846 A1* | 12/2016 | Luse | ..................... | G06F 16/137 |
| | | | | 707/740 |
| 2019/0325033 A1* | 10/2019 | Liu | ..................... | G06F 16/2471 |
| 2020/0045010 A1* | 2/2020 | Sun | ....................... | G06F 3/0643 |
| 2020/0073765 A1* | 3/2020 | Tanwer | ............... | G06F 11/1464 |
| 2020/0142788 A1* | 5/2020 | Hu | ....................... | G06F 11/2035 |
| 2020/0195558 A1* | 6/2020 | Schultz | .................. | H04L 45/42 |
| 2021/0037111 A1* | 2/2021 | Zheng | ................. | H04L 61/1511 |
| 2021/0073043 A1* | 3/2021 | Skuliber | .............. | G06F 9/5061 |

OTHER PUBLICATIONS

Chen et al., Revisiting Consistent Hashing with Bounded Loads, Jun. 2020 (reprint), 32 pages.

Karp et al., Efficient PRAM Simulation on a Distributed Memory Machine, Technical Report, Aug. 1993, 27 pages.

Mirrokni et al., Google AI Blog: Consistent Hashing with Bounded Loads, Apr. 2017, 6 pages, https://ai.googleblog.com/2017/04/consistent-hashing-with-bounded-loads.html.

Mitzenmacher et al., Why Simple Hash Functions Work: Exploiting the Entropy in a Data Stream, School of Engineering & Applied Sciences, Cambridge, Oct. 2007, 22 pages.

Shrivastava et al., Improved Densification of One Permutation Hashing, Jun. 2014, 10 pages.

Vocking, Berthold, How Asymmetry Helps Load Balancing, International Computer Science Institute, Berkeley, 11 pages.

U.S. Appl. No. 17/119,849, Arc Jump: Per-Key Selection of an Alternative Server When Implemented Bounded Loads, filed Dec. 11, 2020.

* cited by examiner

CONSISTENT HASHING USING THE POWER OF K CHOICES IN SERVER PLACEMENT

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

Computing devices (either virtual or physical) can be used to provide network-based services. In many cases, the resources required to host a service exceed those available at a single computing device. Thus, multiple devices act in concert to form a "distributed system" that provides service. One difficulty that arises in such a distributed system is load balancing, as "load" of the service must typically be distributed among the devices in the system in a manner that does not overload any single device (and, preferably, efficiently utilizes the resources of each device). It is often desirable that load balancing occur very quickly, so as not to delay operation of the service. Moreover, many services have particular load balancing requirements. For example, a "stateful" service—one in which the service holds state information for a particular client, for example—typically benefits from deterministic load balancing, such that the same client is always routed to the same device within the distributed system. This enables state to be saved at that device, rather than synchronized across the system (which would incur additional resource use). Such deterministic load balancing is particularly difficult when servers are removed from or added to the distributed system, such as in the case of failure and repair or scaling of the system, as such reconfiguration can in some cases require state information to be migrated from retiring devices and to newly added devices. Virtualization technologies, in simplifying the creation and destruction of computing devices, can further increase these difficulties.

DETAILED DESCRIPTION

Generally described, aspects of the present disclosure relate to load balancing requests among devices in a distributed computing system using a consistent hash ring algorithm. Generally described, a consistent hash ring algorithm (sometimes referred to simply as "consistent hashing"), enables load balancing in a distributed system to occur in a consistent manner, such that the same request (or a related group of requests) are generally routed to the same server of the distributed system. This consistency is beneficial, for example, in enabling each server to locally store information related to these requests, without the need for different servers to synchronize their local information. For example, a distributed system may store data in the form of key value pairs, and enable clients to write to and read from such pairs. In many consistent hashing approaches, the specific server to which a request is routed is relatively fixed. For example, a load balancer acting to route requests to a set of servers may have one and only one "choice" of server to which to route each request. While these approaches attempt to distribute these "choices" such that load is balanced among the servers, in practice these distributions can often lead to localized loads at individual servers, resulting in inefficient resource use or failure. Embodiments of the present disclosure address these problems by providing for improved distribution of requests to a distributed system logically arranged within a consistent hash ring. Some embodiments of the present disclosure leverage "the power of k choices," modifying aspects of the consistent hash ring algorithm such that more than one "choice" is available to a load balancer in creating the hash ring or distributing requests among servers logically arranged into a hash ring. Other embodiments of the present disclosure provide for more even distribution of requests among servers in a distributed system in cases where one or more servers are overloaded, addressing overloading without requiring multiple "choices" as to server placement or request distribution. Still other embodiments of the present disclosure combine the above-mentioned techniques, potentially with others, to provide a robust, efficient, and fast load balancing mechanism that improves on those known in the art.

Figure 1:
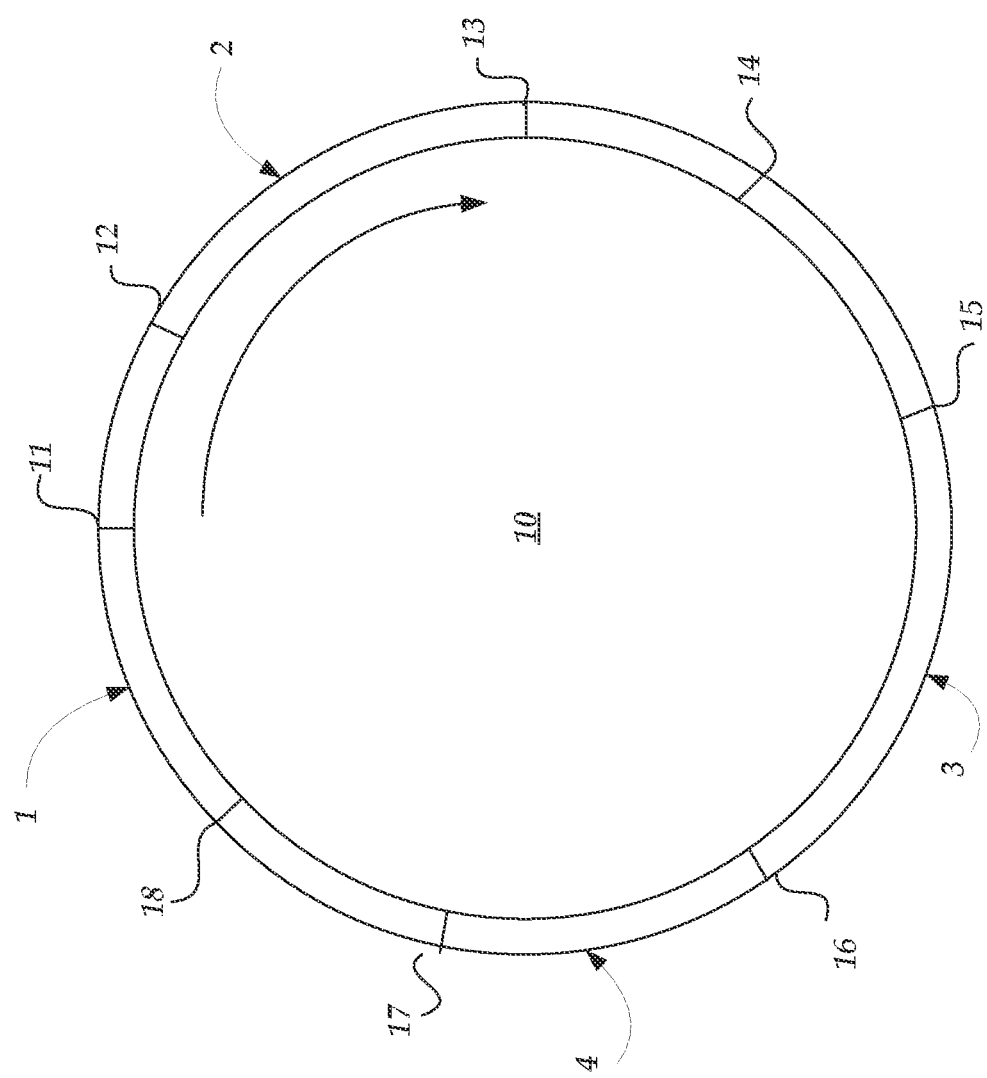
FIG. 1 is an illustrative visualization of a consistent hash ring data structure used in embodiments of the present disclosure.

To better illustrate inventive aspects of the present disclosure, a simplified consistent hash ring algorithm will be described with reference to FIG. 1. In FIG. 1, a distributed set of servers 11-18 are logically arranged within a hash ring 10 (also referred to as a "unit circle"). The servers 11-18 may each be a computing device connected via a network to one or more client computing devices, which servers are configured to provide to the client computing devices a service. To enable the service to be provided rapidly and resiliently, it may be preferable that the servers 11-18 each operate largely independently, such that failure of a single server does not result in complete failure of the service and such that little or no information need be passed between the servers 11-18 during operation. It may further be desirable to provide for load balancing among the servers 11-18 in a manner that distributes load among the servers 11-18 relatively evenly, and in which related requests can be consistently routed to the same server, absent failure. Still further, it may be desirable to enable servers to be added or removed from the set shown in FIG. 1, such as to account for failures or scaling to account for overall use of the service.

Consistent hash rings provide these benefits, by logically arranging the servers 11-18 at various points around the ring 10. Note that this arrangement is logical; servers 11-18 are not required to be (and typically are not) physically arranged within a ring structure. This logical arrangement is instead maintained at a load balancing device, which may be for example a special purpose device interposed between the servers 11-18 and their clients, or may be a client device itself that is programmed with logic to directly load balance requests from the client.

In some instances, the placement of servers 11-18 around the ring 10 is random. In other instances, a deterministic algorithm is used to place servers 11-18 around the ring, with the algorithm selected such that placement is effectively random. For example, a load balancer may place servers 11-18 around the ring 10 by calculating a hash value for each server 11-18, such as by passing an attribute (e.g., identifier) of the server through a hash algorithm. The hash function may be selected such that the hash values collectively represent a random or stochastic distribution around an address space of the ring, which can be selected commensurate with potential outputs of the hash function. That is, where a hash function outputs values between zero and n, locations on the ring 10 may similarly be numbered between zero and n, and each server 11-18 can be placed at a location on the ring matching the hash value calculated for the server 11-18. In one embodiment, the hash function is selected based on display of the avalanche effect—the tendency of a slight change in input to significantly alter an output. This effect leads to different inputs to the hash function having stochastically differing outputs. A variety of hash functions, including a variety of cryptographic hash functions, exhibit this beneficial effect.

A load balancing device may similarly place each request to use the service to a location on the ring 10, and then assign the request to a "next" server 11-18 on the ring 10 (e.g., a closest server in a given direction). For example, an attribute of each request may be passed through a hash function (with a range of outputs matching the locations on the ring 10) to result in a value that maps to a location on the ring 10. Each request may thereafter be passed to a server that occurs next on the ring 10. In FIG. 1, the "next" server is determined in a clockwise direction, as shown by the arrow of the ring 10. For example, request 1 in FIG. 1 falls at a point on the ring 10 such that the next server in a clockwise direction is server 11. Thus, a load balancing device would provide request 1 to server 11. Similarly, request 2 would be passed to server 13, request 3 to server 16, request 4 to server 17, etc. The attribute of each request can be selected such that requests are expected to be randomly located around the ring 10, leading to an expected "even" balancing of requests among the servers 11-18.

While clockwise mapping is shown in FIG. 1, other mappings are possible. For example, a load balancer may map counter-clockwise, or map to a closest server in any direction. In some instances, a load may change mapping direction on a per-key basis. For example, the load balancer may map in a clockwise direction for even location values and in a counterclockwise direction for odd location values. This, the clockwise directionality in FIG. 1 is intended to be illustrative in nature.

Consistent hashing provides multiple benefits when load balancing. For example, load balancing can occur deterministically, such that multiple load balancers can themselves act in a distributed manner, each routing corresponding requests to the same server in the target load-balanced distributed system. As a further benefit, a change in the number of servers in such system incurs minimal data migration—affecting only the "arc" of the ring on which the changed server is placed, rather than requiring reshuffling of data among all servers. However, this simplified consistent hashing algorithm may also face difficulties. For example, random placement of servers on a ring may result in some servers having much larger "arcs" (the portion of the ring assigned to the server) than others. In some cases, particular areas of the ring may correspond to especially resource intensive requests, and thus a server associated with that area may become overloaded even if servers are spaced evenly among the ring. It is therefore beneficial to further develop this simplified algorithm to address these problems.

Embodiments of the present disclosure do so by providing a consistent hash ring algorithm in which servers forming a distributed system are placed at one of k potential locations. As noted above, in a simplified algorithm, servers can be placed effectively randomly around a logical ring, such as by passing an attribute (e.g., name) of a server through a hash function and placing the server at a location on the ring corresponding to the resulting hash value. Embodiments of the present disclosure improve on this placement mechanism by determining k potential placement locations, such as by taking two hash values for the server, and selecting a preferred location among the k potential locations. The preferred location may be determined according to a variety of comparisons, such as the length of the respective arcs for the potential locations or the load on servers associated with the potential locations. Selection between k potential locations can enable more even load balancing when compared to selection of a single location, as it may enable load balancing to avoid a "worst" location among the ring. Moreover, by bounding selection to k locations, the computational complexity associated with server placement is similarly bounded, avoiding the excessive resources that would generally be required, for example, to select an optimal location from among all possible locations. In this way, selection among k potential locations can provide benefits similar to "the power of two choices"—a technique known in other load balancing approaches to improve load distribution.

Placement using k potential locations can provide benefits relative to other alternative placement techniques. For example, another technique that might be used in an attempt to evenly place servers is to place a server at multiple points on the ring. This technique is sometimes referred to as use of "virtual nodes," since each server (or "node") exists at more than one location. For example, in FIG. 1, servers 13 and 17 may correspond to the same server logically placed at two points in the ring 10. Use of virtual nodes can in some cases lead to improvement over placement at a single location. However, this placement does not select among k potential locations, but rather simply places the server at k locations among the ring. As such, while the server is necessarily placed at the best location among the k locations, it is also necessarily placed at the worst. As a result, load is often distributed unevenly among servers. While increasing the number of virtual nodes—the number of locations on the ring at which a server is placed—can somewhat address this issue, this also results in a correspondingly large amount of memory required at a load balancing device in order to store the various locations of all nodes on the ring. Selection among k locations, rather than automatic placement at k locations, can provide benefits without resulting in increased memory use at a load balancing device.

In some embodiments, the use of k choices can further be extended to data placement on the ring, in addition or as an alternative to server placement. Data stored at servers within a distributed system can be generalized as key value pairs, where a "key" corresponds to an identifier for a request, and the corresponding "value" is information (such as state information) stored at a server in the distributed system. The key may, for example, be included within the request or derived from the request, such as an identifier of content requested, an identifier of a requesting device, etc., or other value that is expected to be relatively evenly distributed among all requests. The identifier may in some instances be referred to as a "partition key," as it acts to partition requests among the servers in a distributed system. In a simplified consistent hash ring algorithm, this key can correspond to a single location on a hash ring, and as such, determine the server assigned to store a corresponding value. For example, under such an algorithm the key may be passed through a hash algorithm to result in a hash value that corresponds to a location on the ring and thus a server to service the request (e.g., the locations 1-4 in FIG. 1). In some cases, this mapping between a key and a single location can lead to uneven load.

To address this, embodiments of the present disclosure can derive k locations for a single key. When an initial request to set the value of a key is received, a load balancer can determine a set of servers, each corresponding to a location of the k locations. The load balancer can then route the request to a preferred server from the determined set. Similarly to the placement techniques described above, this technique can leverage the "power of k choices" concept for key placement, routing requests to create a key to a preferred (e.g., least loaded) server rather than to a single defined server. When serving a request to read the key, a load balancer may route the request based on all k locations (e.g., to each server associated with a location of the k locations, which may be k servers or less than k servers when multiple locations of the k locations fall within the same arc). By routing the request to all k locations, the load balancer can generally guarantee that request is routed to the server that was initially selected to store the value for the key. Notably, this technique does not require the load balancer to store state information for the request, which would otherwise require significant computing resources at the load balancer and inhibit distributed load balancing. Instead, by routing reads to all k locations, the load balancer can effectively "trade" bandwidth for placement efficiency—requesting in an k-fold increase in bandwidth when servicing requests to interact with an established key, but gaining the benefits of preferred placement of the key among the servers in the distributed system.

In some cases, embodiments of the present disclosure may be described by reference to a "bin/ball" analogy, where servers within a distributed system are represented as "bins," while keys managed by the system are represented as "balls." Thus, storage of a key at a server can be analogized to placement of a ball into a bin. Under this analogy, placement of a servers on a hash ring can then be described as "bin placement." Creation of a key on the distributed system can be described as "ball placement," while retrieval or updating of a key value can be described as "ball retrieval." This terminology may be in some cases be helpful to describing the present embodiments. For example, a simplified consistent hash ring algorithm may be described as resulting in a single possible location on a ring for each bin, while embodiments of the present disclosure can leverage the "power of k choices" concept to select from k possible locations for the bin, improving bin placement significantly. Similarly, embodiments of the present disclosure can use this same concept to select from k possible bins in which to place a ball, improving ball placement significantly.

Embodiments of the present disclosure can be used in conjunction with other optimization techniques. For example, another optimization technique for consistent hash rings is to implement "bounded loads," in which each server in a distributed system is associated with a defined load threshold set in terms of number of keys, computational resource usage, etc. A load balancer may initially route requests to create a key to a server associated with the key via a given consistent hash ring algorithm. If the server is overloaded (over their defined load threshold), the server can decline to store the key, and the load balancer can then submit the request to a next server on the hash ring. This approach can improve distribution of load in a distributed system, as a given server is prevented from becoming overloaded. However, this approach can lead to "cascades," in which a given server becoming overloaded causes an increase in load to a next server within the ring, which in turn is more likely to become overloaded. Embodiments of the present disclosure, and particularly "ball placement" using the "power or k choices" can limit or eliminate this cascading effect, as load can be effectively distributed among the server choices (corresponding to the k locations for the key), limiting the likelihood of an overloaded server.

Embodiments of the present disclosure can further improve on the concept of "bounded loads" by providing for improved selection of a "next" server in the case of the initially-selected server becoming overloaded. Using a simplified bounded loads approach, a load balancer, when incurring an overloaded server, may always route a request to an adjacent server on the consistent hash ring. For example, with reference again to FIG. 1, a request initially routed to server 11 would, if server 11 became overloaded, instead be routed to server 12. Similarly, requests that would otherwise be routed to server 12 would, if server 12 become overloaded, be routed to server 13, etc. Because all requests that would otherwise go to the overloaded server are routed to the same "next" server, this next server is more likely to itself become overloaded.

Embodiments of the present disclosure can improve this approach, by varying the "next" server on a per-key basis. For example, rather than always selecting an adjacent server when encountering an overloaded server, a load balancer may instead generate an alternative hash value for a key, and route the request to the server associated with the alternative hash value on the ring. The alternative hash value can be generated such that different keys are expected (with a high probability) to have different alternative hash values. For example, the alternative hash value may be generated by appending a counter to the key prior to passing the key through a hash algorithm. Illustratively, if the key is "key_1," a value of "retry_1" may be appended to the key, such that the value passed to the hash algorithm is "key_1; retry_1." As a result, a new hash value is generated that is substantially unique to the key. This new hash value can be used as a basis for selecting an alternative server, in the instance that a first server is overloaded. Because the alternative value for each key would be expected to differ (as different inputs to a hash function are generally expected to result in different hash values), the "next" server attempted for different keys would also be expected to differ. Accordingly, the increased load caused to the ring due to an overloaded server is distributed among the servers, rather than concentrated on a single adjacent server. The cascading effect described above is therefore reduced or eliminated. Because the alternative server is unlikely to be the adjacent server (at least in a system with more than 3 servers), this alternative server selection technique may be described as an "arc jump" algorithm.

While described herein with respect to key value pairs, embodiments of the present disclosure may be utilized in a wide variety of load balancing applications. The "keys" discussed herein may represent any substantially unique identifier for information, while the "values" may represent any data associated with that identifier. For example, data may be stored in the form of data "objects," with the object name or identifier representing a key and the content of the object representing a corresponding value. Thus, embodiments described herein can be applied in any instance where a consistent routing of a given request within a distributed system is desired, and description of "key value pairs" is intended to encompass any storage of data in a distributed system where individual data items are associated with a unique identifier of that data item.

As will be appreciated by one of skill in the art in light of the present disclosure, the embodiments disclosed herein improve the ability of computing systems, such as distributed computing systems, to support large number of requests. Moreover, the presently disclosed embodiments address technical problems inherent within computing systems; specifically, the limited nature of computing resources available to at an individual computing device, and the difficulty in rapidly and evenly distributing load among multiple computing devices acting in concert to provide a service. These technical problems are addressed by the various technical solutions described herein, including application of the "power of k choices" concept to server and/or key placement on a consistent hash ring, the use of "power of k choices" key placement to inhibit the cascade effect when using bounded loads on a consistent hash ring, and the use of an arc jump algorithm to prevent the cascade effect when using bounded loads on a consistent hash ring. Thus, the present disclosure represents an improvement on distributed computing systems and computing systems in general.

The foregoing aspects and many of the attendant advantages of this disclosure will become more readily appreciated as the same become better understood by reference to the following description, when taken in conjunction with the accompanying drawings.

Figure 2:
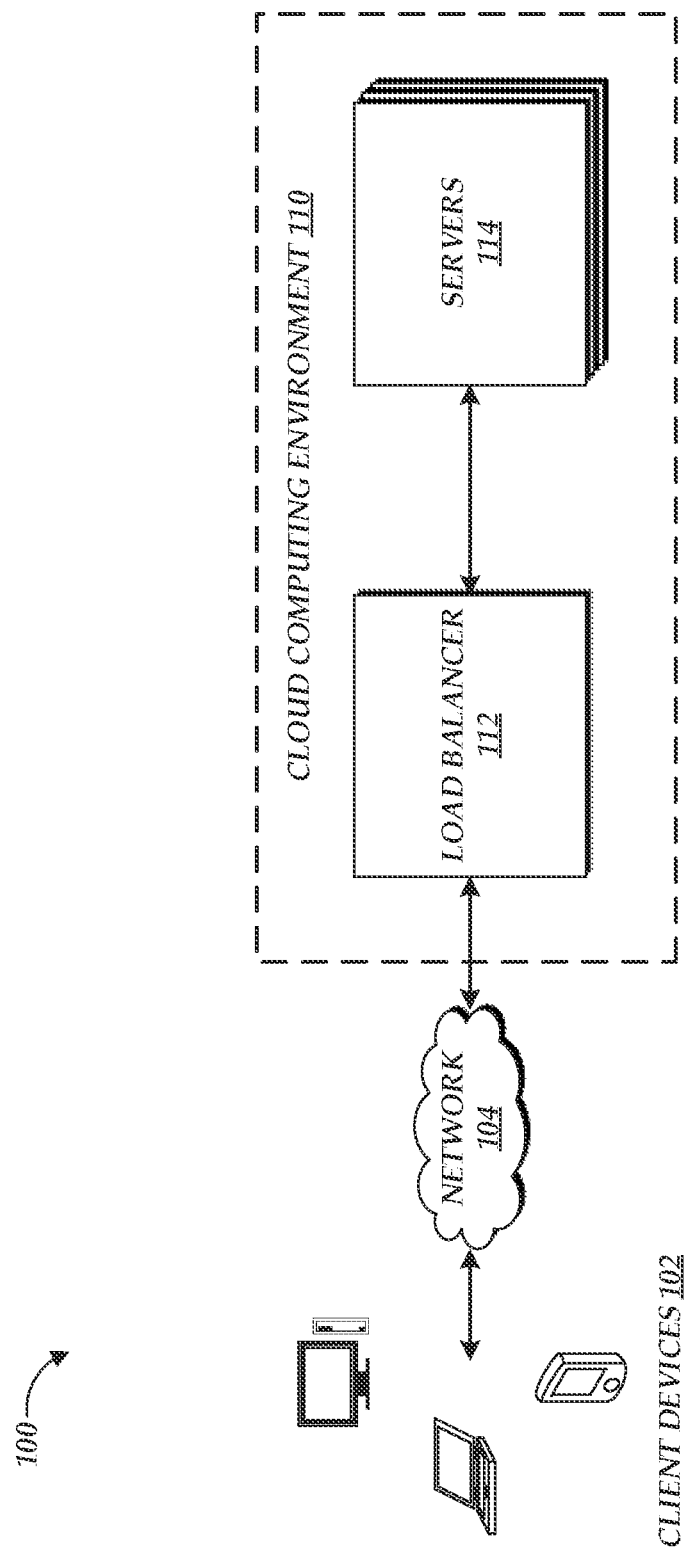
FIG. 2 is a block diagram depicting an illustrative environment in which an a load balancer can operate to distribute requests to servers in a distributed system utilizing a consistent hash ring algorithm in accordance with embodiments of the present disclosure.

FIG. 2 is a block diagram of an illustrative operating environment 100 in which a cloud computing environment 110 may operate to provide a network-accessible service to client devices 102. By way of illustration, various example client computing devices 102 are shown in communication with the on-demand code execution system 110, including a desktop computer, laptop, and a mobile phone. While shown in FIG. 2 as end user devices, client computing devices 102 can be any computing device, including end user computing devices such as a desktops, laptops or tablet computers, personal computers, wearable computers, personal digital assistants (PDAs), hybrid PDAs/mobile phones, mobile phones, electronic book readers, set-top boxes, voice command devices, cameras, digital media players, and the like, as well as non-user devices, such as servers that themselves provide network-accessible services to end user devices.

A cloud computing environment (sometimes referred to simply as a "cloud"), such as the environment 110 of FIG. 2, refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud computing environment 110 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The cloud computing environment 110 can provide a variety of services to client devices 102, such as compute services (e.g., services enabling creation of on-demand processing power) and a block storage services (e.g., services enabling creation of on-demand block storage devices). Some implementations of the cloud computing environment 110 can additionally include domain name services ("DNS") services, object storage services, relational database services, and other service configurations for supporting on-demand cloud computing platforms. Each service may be implemented by servers having hardware computer memory and/or processors, an operating system that provides executable program instructions for the general administration and operation of that server, and a computer-readable medium storing instructions that, when executed by a processor of the server, allow the server to perform its intended functions. Each service may implement one or more user interfaces (including graphical user interfaces ("GUIs"), command line interfaces ("CLIs"), application programming interfaces ("APIs")) enabling end users, via client devices 102, to access and configure resources provided by the various services.

The cloud computing environment 110 can provide on-demand, scalable computing platforms to users through the network 104, for example allowing users to have at their disposal scalable "virtual computing devices" via their use of a compute service and block storage service. These virtual computing devices have attributes of a personal computing device including hardware (various types of processors, local memory, random access memory ("RAM"), and hard-disk and/or SSD storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud computing environment 110 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center ("TC"). TCs are the primary backbone locations linking customers to the cloud provider network, and may be collocated at other network provider facilities (e.g., Internet service providers, telecommunications providers) and securely connected (e.g. via a virtual private network ("VPN") or direct connection) to the availability zones. Each region can operate two or more TCs for redundancy. Regions are connected to a global network which includes private networking infrastructure (e.g., fiber connections controlled by the cloud provider) connecting each region to at least one other region. The cloud computing environment 110 may deliver content from points of presence outside of, but networked with, these regions by way of edge locations and regional edge cache servers. This compartmentalization and geographic distribution of computing hardware enables the cloud computing environment 110 to provide low-latency resource access to customers on a global scale with a high degree of fault tolerance and stability.

As illustrated in FIG. 2, the cloud provider network 110 can communicate over network 104 with client devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein.

In FIG. 2, the environment 110 includes a set of servers 114 configured to provide a network-accessible service. The techniques described herein are widely applicable to a variety of services, and as such, the particular service provided by servers 114 is not described in detail herein. However, each server 114 illustratively corresponds to a computing device—virtual or physical—configured with executable instructions to provide the service to client devices 102. The servers 114 may illustratively be created by interaction between a user and the cloud computing environment 110, such as to provision compute resources of the environment 110 to provide the servers 114.

In addition, the environment 110 includes a load balancer 112 configured to distribute requests for the service from client devices 102 to individual servers 114. The load balancer 112 may be a dedicated load balancing computing device or a general purpose computing device configured to provide load balancing functionality. The load balancer 112 may be a physical device, or a virtual device implemented on physical hardware of the environment 110. In FIG. 2, the load balancer 112 is shown as interposed between the client devices 102 and servers 114, representing that request from client devices 102 are first passed to the load balancer 112 before being passed to the servers 114. In some instances, this arrangement may be physical: the servers 114 may be physically linked to the load balancer 112, such the servers 114 are accessible from the network 104 only through the load balancer 112. In other instances, this arrangement may be logical, such that requests for the service are routed by the environment 110 the load balancer 112, which subsequently forwards or redirects the requests to the servers 114.

The load balancer 112 can illustratively maintain information regarding the set of servers 114, to enable distribution of requests to the servers 114. For example, the load balancer 112 may maintain a record of individual servers within the servers 114, such that new servers may be added, or old servers removed, from the set of servers 114 (e.g., via operation of the cloud computing environment 110 to rapidly create or destroy servers 114). The load balancer 112 may further maintain load or health information for individual servers. Such information may include, for example, a number of requests serviced by a server 114 in a given time frame, computational resource usage or availability of an individual server 114, response time metrics of a server 114, error counts for an individual server 114, etc. This information may be used by the load balancer 112 in implementing the techniques described herein. In some instances, the load balancer 112 may collect this information directly, such as by periodically communicating with each server 114 to gather the information. In other instances, the environment 110 may include additional health checking devices (not shown in FIG. 2) that collect this information and make it available to the load balancer 112.

In accordance with embodiments of the present disclosure, the load balancer 112 can implement an improved consistent hash ring algorithm to distribute load among the servers 114. In some embodiments, this improved algorithm includes implementing "the power of k choices" techniques for server placement among a hash ring, request placement among the ring, or both. In other embodiments, this improved algorithm includes implementing "arc jump" hashing in conjunction with "bounded loads," such that when a server 114 becomes overloaded a "next" server 114 is selected on a per-key basis. As noted above, these techniques (which are usable individually or in combination) can provide substantial improvement to operation of the load balancer and servers 114, providing for more evenly distributed load among servers 114 without inhibiting rapid operation of the load balancer 112.

While a single load balancer is shown in FIG. 2, embodiments of the present disclosure may include multiple load balancers 112 that themselves act as a distributed service. Each load balancer 112 can implement the techniques described herein in order to gain the advantages of these techniques. In some instances, these techniques may be implemented with little or no synchronization of information or coordination between load balancers 112, other than implementing the same techniques. In other instances, multiple load balancers 112 may be coordinated to share at least some information during operation. For example, an individual load balancer 112 may select a location for a newly added server on a consistent hash ring, and communicate that selection to other load balancers 112.

While some functionalities are generally described herein with reference to an individual component of the on-demand code execution system 110, other components or a combination of components may additionally or alternatively implement such functionalities. For example, frontends 120 may operate in a peer-to-peer manner to provide functionality corresponding to the counting service 170, as opposed to including a distinct service 170.

Figure 3:
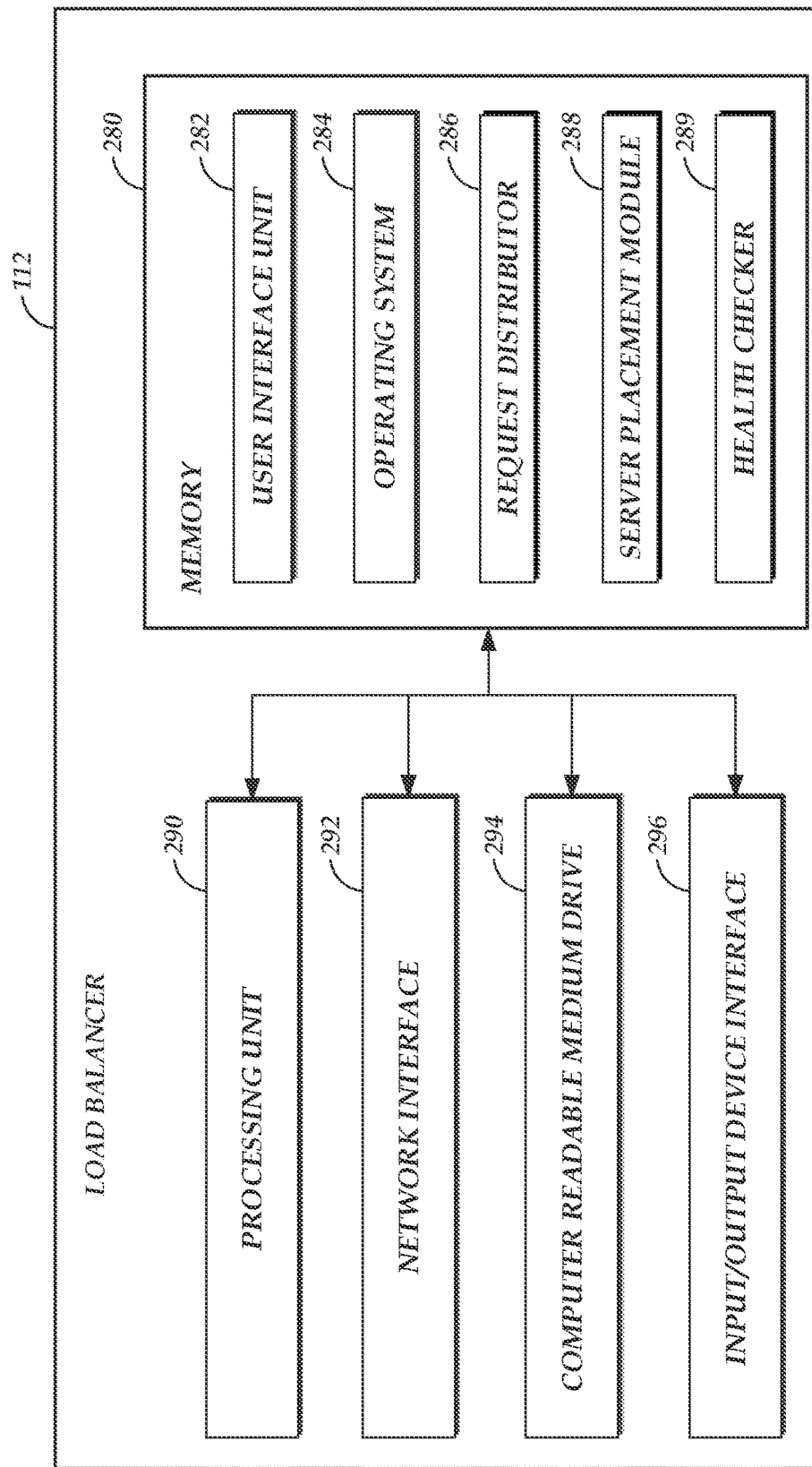
FIG. 3 depicts a general architecture of a computing device providing a load balancer that is configured to distribute requests to servers in a distributed system utilizing a consistent hash ring algorithm in accordance with embodiments of the present disclosure.

FIG. 3 depicts a general architecture of a computing system (referenced as load balancer 112) that operates to facilitate load balancing via an improved consistent hash ring algorithm in accordance with embodiments of the present disclosure. The general architecture of the load balancer 112 depicted in FIG. 3 includes an arrangement of computer hardware and software modules that may be used to implement aspects of the present disclosure. The hardware modules may be implemented with physical electronic devices, as discussed in greater detail below. The load balancer 112 may include many more (or fewer) elements than those shown in FIG. 3. It is not necessary, however, that all of these generally conventional elements be shown in order to provide an enabling disclosure. Additionally, the general architecture illustrated in FIG. 3 may be used to implement one or more of the other components illustrated in FIG. 2. As illustrated, the load balancer 112 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as modules in some embodiments) that the processing unit 290 executes in order to implement one or more aspects of the present disclosure. The memory 280 generally includes random access memory (RAM), read only memory (ROM) and/or other persistent, auxiliary or non-transitory computer readable media. The memory 280 may store an operating system 284 that provides computer program instructions for use by the processing unit 290 in the general administration and operation of the load balancer 112. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device. In addition, the memory 280 may include and/or communicate with one or more data repositories (not shown), for example, to access user program codes and/or libraries.

In addition to and/or in combination with the user interface unit 282, the memory 280 may include a request distributor 122, server placement module 288, and health checker 289 that may be executed by the processing unit 290. In one embodiment, the request distributor 122, server placement module 288, and health checker 289 implement various aspects of the present disclosure. For example, the request distributor 286 can represent code executable to distribute requests to access a service to individual servers (e.g., servers 114) that provide that service, the server placement module 288 can represent code executable to place servers 114 among a logical ring, and the health checker 289 can represent code executable to gather health or load information from the servers 114.

Figure 4:
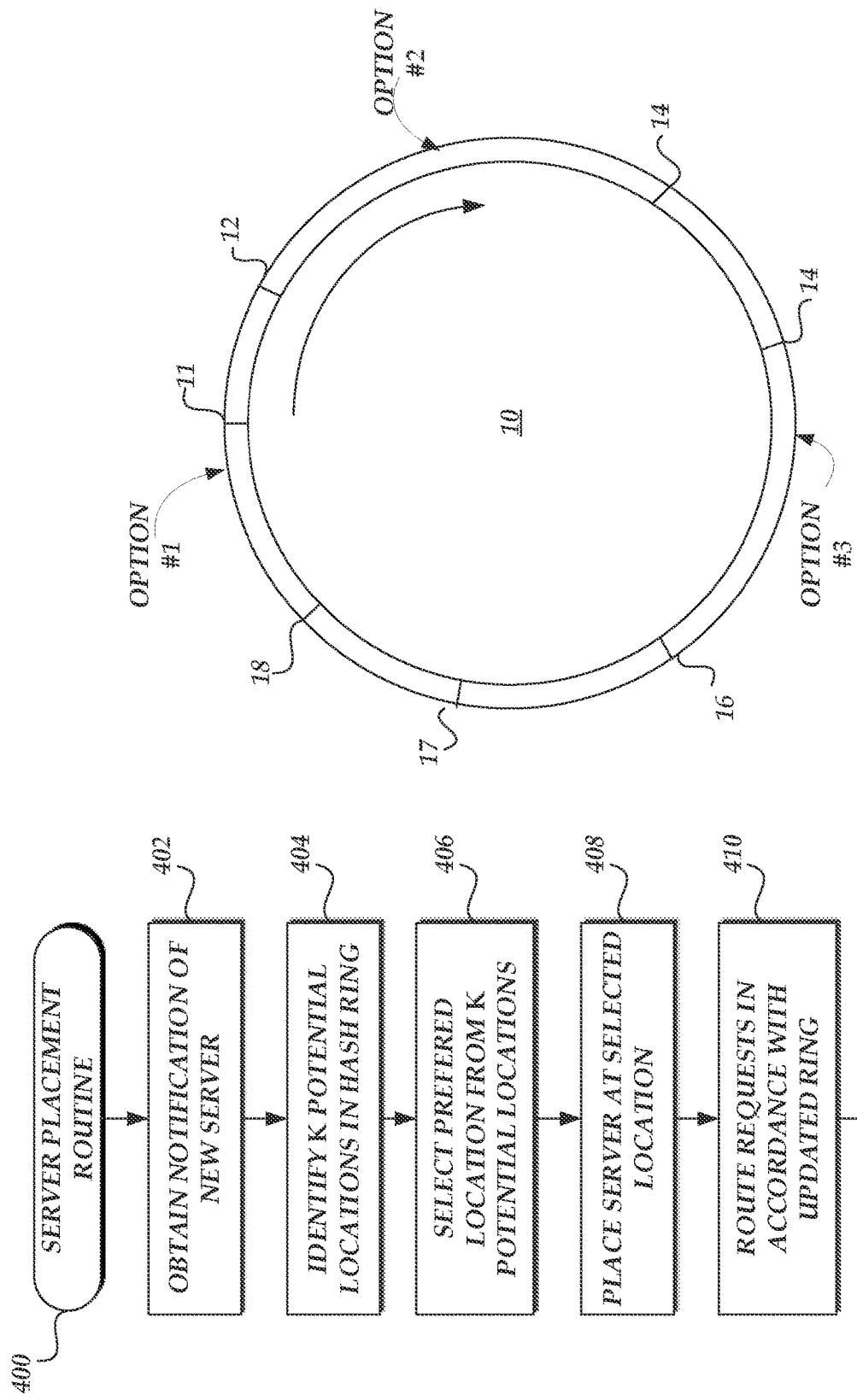
FIG. 4 depicts a flow chart showing an illustrative routine for placement of a server on a consistent hash ring, which is also shown in FIG. 4.

With reference to FIG. 4, an illustrative routine 400 will be described for placing servers within a consistent hash ring according to embodiments of the present disclosure. Specifically, the routine 400 enables a new server to be added to a hash ring at one of k potential locations, rather than at a single location. As noted above, this improves on server placement within hash rings by enabling the server to avoid a "worst" placement on the ring, thereby improving distribution of requests. The routine 400 may be implemented, for example, by a load balancer 112 of FIG. 1 or by a client device 102 that itself operates as a load balancer.

The routine 400 begins at block 402, where the load balancer 112 obtains a notification of a new server to be added to the ring 10 of FIG. 1, which is reproduced in FIG. 4 for ease of reference. Addition of the new server can enable the new server to act as part of a distributed system. The new server may be added manually by an administrator of the distributed system, or automatically via operation of the distributed system. For example, the cloud computing environment 110 may be configured to add new servers 114 when the load on the existing servers 114 exceeds a threshold, or to periodically "tear down" one or more existing servers 114 and to replace those servers 114 with a new server, thus "cycling" servers to avoid issues that may occur when a single server 114 is in operation for long periods of time.

At block 404, the load balancer 112 identifies k potential locations in the hash ring for the new server. The value of k may be set in accordance with the requirements of the distributed system, with higher values of k generally providing better load balancing, but also generally requiring more computing resources in terms of the routine 400. In various embodiments, k may be set as 2, 3, 4, 5, 10, 15, 50, 100, or more. Each location may be selected according to a selection mechanism expected to result in an effectively random distribution of the k locations. For example, an attribute of the server (such as internet protocol, or IP, address, machine name, etc.) may be passed through k different hash functions to result in k different values, each corresponding to a location on the ring 10. As another example, the attribute of the server may be "seeded" with different information for each of the k locations and passed through a single hash algorithm. Illustratively, for locations numbered 1 through k, the attribute may be seeded with a location number (e.g., as "<attribute><location_number>") prior to being passed through a hash function, such that each seeded attribute is associated with a different hash value and corresponding location on the ring 10. As yet another example, a first hash value may be re-hashed (e.g., through the same function used to calculate the first hash value) to result in a second hash value, which may in turn be re-hashed to result in a third hash value, etc. This technique is generally referred to herein as "re-hashing." One example set of k locations is shown on the ring 10 of FIG. 4 as a set of options numbered 1-3, each of which represents a potential location for placement of a new server.

Once the k potential locations are determined, the routine 400 proceeds to block 406, where the load balancer 112 selects a preferred location from the k potential locations. In general, selection of a preferred location can be conducted as a comparison of a score associated with each location. Moreover, because placement of a new server generally effects only the particular "arc" into which the new server is placed, this score can be calculated based on an expected effect of "splitting" each arc associated with each of the k potential locations. For example, in a ring 10 where selection proceeds clockwise, as shown in FIG. 4, placement of a new server at location option number 1 would result in a majority of the arc previously associated with server 11 being instead associated with the new server, and only a minority of that arc remaining associated with server 11. Placement of the new server at location option 2 would result in a generally even split of the arc previously associated with server 14, with roughly half of that arc load being directed to the new server and roughly half of the arc load still being directed to server 14. Placement of a new server at location option 3 would result in a minority of the arc previously associated with server 16 being redirected to the new server, with a majority of that load being maintained at server 16. Each such result can be evaluated to compare the potential locations and selected a preferred location.

A variety of such comparisons are possible. In one embodiment, the load balancer 112 may select a preferred location as the location option that corresponds to the largest existing arc, enabling the load balancer 112 to split load associated with that arc. In another embodiment, the load balancer 112 may maintain specific load information for each server associated with the arc of each location, and select a location that reduces the load of a most loaded server (e.g., by splitting the arc of that server). In some instances, other health metrics of each server may additionally or alternatively be used. For example, some distributed systems implement server cycling, in which individual servers are periodically (or substantially periodically) removed from the system and replaced with new servers. Other systems may be designed such that server failure is assumed within a range of times (e.g., with each server having a statistical mean time to failure). To address this, in some embodiments the load balancer 112 may select a location corresponding to the arc of an oldest server, or server closest to expected removal or failure, such that load is removed prior to that removal or failure. In still other embodiments, the load balancer 112 may maintain information as to the number of keys stored at each server, or the amount of data stored in associated with those keys, and select an arc location that minimizes the amount of data migration required should the server corresponding to each potential location fail. These criteria may in some instances be combined. For example, the load balancer 112 may implement a scoring algorithm that combines each criteria according to a weighted linear combination, with weights of each criteria selected by an administrator of the distributed system according to the load balancing requirements of that system. The highest scoring location can then be set as the preferred location. Notably, by bounding the selection to a comparison of k locations, rather than a comparison of all potential locations on the ring 10, the complexity of this operation is constrained and the resources required to select among locations are similarly bounded.

In some instances, the load balancer 112 may implement a "tie breaking" functionality, when scores of two locations on the ring 110 are equal. Any number of tie breaking functionalities may be used, such as selecting the lowest or highest numbered location among the tied locations, selecting a location closest to a fixed point on the ring 10, etc.

After making a selection, the load balancer 112 at block 408 places the new server at the selected location. Placement can include updating a logical representation of the ring 10 in memory of the load balancer 112. In some instances, placement can include communicating a placement decision to other load balancers 112, such as those operating to provide distributing load balancing. Alternatively, multiple load balancers 112 may operate based on a shared logical representation of the ring 10, such as in a strongly consistent data store accessible to each load balancer 122, such that modification of the ring 10 by a first load balancer 112 also modifies the ring 10 for a second load balancer 112. Still further, placement may include migrating data to the new server from an existing server corresponding to the arc on which the new server is placed. Specifically, because the new server would be expected to relieve load from an existing server (the server associated with the arc of the ring 10 on which the new server was placed), key value pairs of the existing server can be migrated to the new server, such that the new server can service requests associated with the key value pairs. Migration may occur asynchronously or synchronously to requests. For example, the new server may retrieve key value pairs "lazily," such as in response to a request associated with a key value pair, "greedily" without requiring such a request, or a combination thereof.

Thereafter, at block 410, the load balancer 112 routes requests to the distributed system in accordance with the updated ring 10. For example, requests that fall along the arc now associated with the new server (e.g., preceding the new server on the ring 10 and subsequent to another server) may be routed to the new server. Thus, load can be distributed among the new server and the existing servers. Moreover, because the new server is selectively placed on the ring 10 at one of k locations, rather than at a location fixed according to the algorithm and without consideration of factors such as arc length and load, load among the ring 10 is more evenly distributed.

Figure 5:
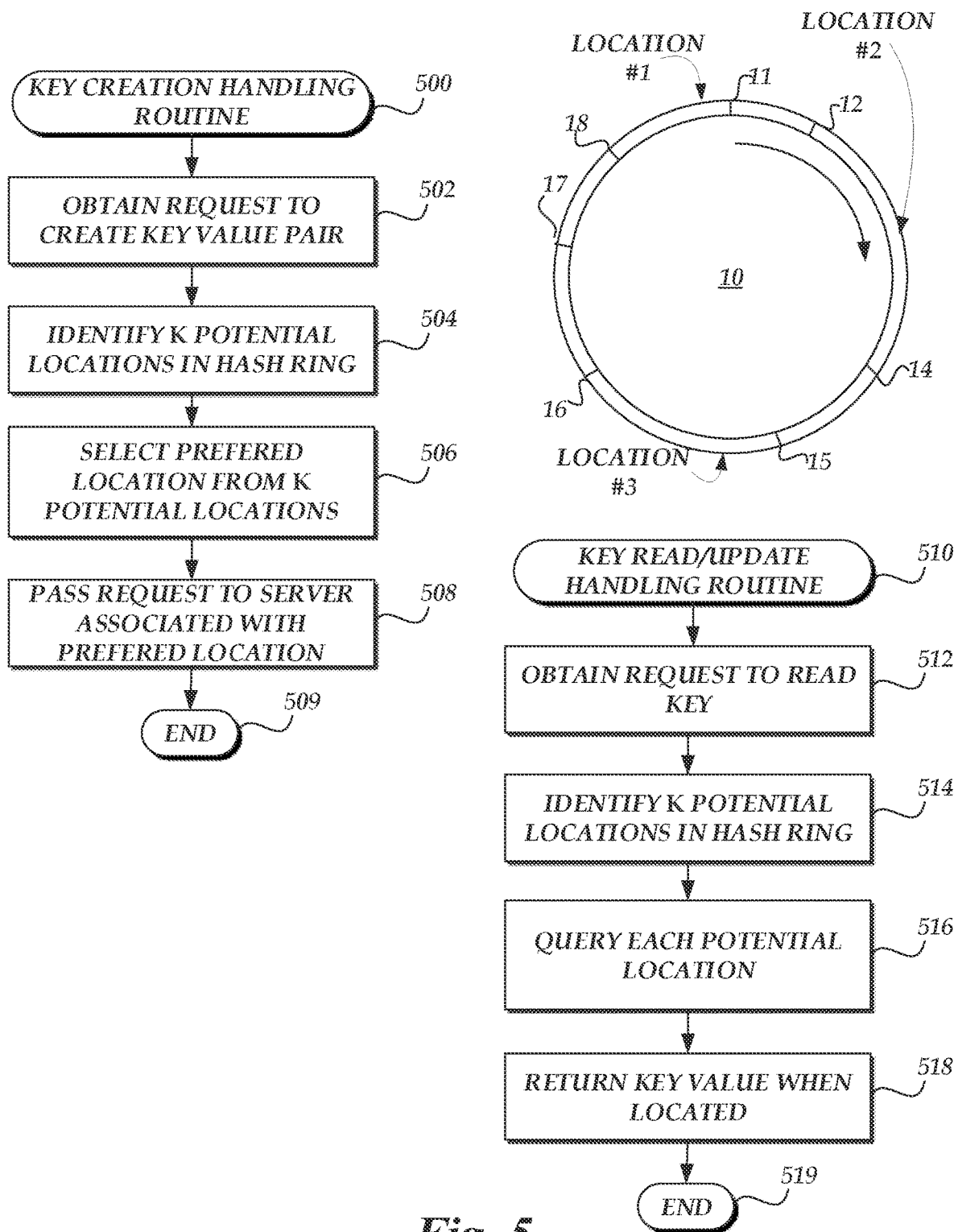
FIG. 5 depicts a flow chart showing an illustrative routine for placement of data objects on a consistent hash ring, which is also shown in FIG. 4, as well as a flow chart showing an illustrative routine for retrieving data objects placed on the consistent hash ring according to the placement routine of FIG. 4.

While FIG. 4 discusses how the concept of "the power of k choices" can be used in making server placement decisions, this concept can additionally or alternatively be used in making data placement decisions on the ring 10. An example routine 500 for making data placement decisions using "the power of k choices" concept is shown in FIG. 5. Because of the nature of data placement under this routine 500, a load balancer 112 may also modify how data is read from a distributed system. As such, an example routine 510 to read data from a system employing "the power of k choices" concept for data placement is also shown in FIG. 5, along with a reproduction of the consistent hash ring 10 of FIG. 1, which is provided for ease of reference.

The routine 500 begins at block 502, where a load balancer 112 obtains a requests to create a key value pair on a distributed system. (Recall that a key may represent any unique identifier of a data item or object, and thus that this request may correspond to, for example, a request to create a new data object on the system.) The request is illustratively received from a client device 102. In the instance that a client device 102 itself implements the load balancer 112, the request may be obtained via execution of code on the client device 102 which is passed to a load balancing function on that device 102.

At block 504, the load balancer 112 identifies k potential locations on the hash ring 10 at which to store the key value pair. As noted above, because the hash ring 10 is a logical construct, data is not literally stored "within" the hash ring 10. However, the location for the data on the hash ring 10 is used to determine a server 114 which stores the data, and thus this description adopts, for descriptive purposes only, a convention in which data "is stored" at a location on the ring 10. The k locations may be determined in a similar manner to determining the k locations for potential server placement, as described above with reference to FIG. 4. For example, an attribute (e.g., a "partition key") of the key may be passed through k hash functions to obtain k values, each a location on the ring 10. Alternatively, the attribute may be "seeded" with k different seed values prior to being passed through a hash function, such that k hash values are produced, each a location on the ring 10. In still another alternative, re-hashing (passing a given hash value through a hash function again to result in a next hash value) may be used to determine locations. Three possible locations are shown in FIG. 5 with respect to the hash ring 10, numbered one through three.

At block 506, the load balancer 506 selects a preferred location at which to store the key value pair from the k potential locations. Similarly to selection of a location for server placement, selection of a preferred location at which to store a key value pair can include a comparison of a placement score for each potential location. The placement score can be calculated in a variety of ways. For example, placement score may be a function of at least the load on the respective servers corresponding to each location, such that locations associated with heavily loaded servers are scored less than locations associated with lightly loaded servers. Illustratively, the locations 1-3 of FIG. 5 may be compared on the basis of the load on servers 11, 14, and 16. As another example, placement score may be calculated based at least partly on the length of the arc corresponding to each potential location. In many cases, arc length may correlate strongly with load, and thus arc length can be used as at least a partial proxy for measuring load on a server. Moreover, a longer arc length may indicate a higher likelihood that data stored on the arc would subsequently need to be migrated, as it may indicate a higher likelihood that a new server is inserted onto the arc. Illustratively, the locations 1-3 of FIG. 5 may be compared on the basis of the length of the arcs on which the locations lay. Other criteria are also possible. For example, the distance between a data storage location and a next server may be used in scoring a location, such that data is preferentially stored at locations closer to a next server. This may be due to the lower likelihood of such data being migrated in the future (since migration generally occurs when a new server is inserted between a data's storage location and the location of the next server). As another example, the age or expected failure rate of a storing server may be used, such that data is preferentially stored at younger servers or servers with a lower expected failure rate (or, conversely, higher expected time to failure). As still another example, the specific device configuration of a storing server may be used as a criterion. For example, specific configurations of server (e.g., having particular hardware or software) may be well suited for particular types of data object, have a lower cost of operation, etc., and as such may be preferentially selected to store a new key value pair. Any one or more of the above criteria may be used in selecting a location. For example, multiple criteria may be combined, such as via a weighted linear combination, to determine a score for each location. Once determined, the load balancer 112 selects a highest scoring location from the k potential locations as the location at which to store the key value pair.

Thereafter, at block 508, the load balancer 112 forwards the request to the server associated with the preferred location, or otherwise causes the server to service the request by storing the key value pair. The data is thus stored in the distributed system. Moreover, because the data is stored at one of k potential locations, rather than at a location fixed according to the algorithm (e.g., without regard to load), load of the system overall is more balanced. This additional balancing is particularly beneficial when used in combination with other techniques, such as "bounded loads," described above, in which an overloaded server can cause data to be stored at a subsequent server on the ring 10. In particular, the technique of the routine 500 can enable a load balancer 112 to avoid invoking this bounded loads functionality, since data can be stored at another of the k locations rather than the "bounded load" location (e.g., a server subsequent to an overloaded server). This beneficially breaks the "cascade" effect that might otherwise occur when using bounded loads, and thus represents a substantial improvement to more general use of bounded loads.

One potential difficulty when storing data in the manner of routine 500 is the difficulty of later determining where the data is stored. It is often not preferable for a load balancer 112 to maintain specific information as to the storage location of individual data items, as this requires significant computing resources and inhibits distributed operation of the load balancer (e.g., due to the need to synchronize the information among multiple load balancers). To avoid the need to store such state information, a load balancer 112 can be configured to read data according to the routine 510 of FIG. 5. The routine 510 is similar to the routine 500, except that it pertains to reading a key value pair (or, potentially, modifying the value of an existing key value pair) rather than creating the pair. Specifically, the routine 510 begins at block 512, where the load balancer 112 obtains a request to read the value of a key in a manner similar to obtaining a request to create a key (as occurred at block 502 of routine 500). The routine 510 then proceeds to block 514, where the load balancer 112 identifies k potential locations for the key, in a manner similar to block 504 of the routine 500. At block 516, rather than selecting an individual location from the k potential locations, the load balancer 112 queries each potential location to determine whether the key is stored at the location. As the key was stored at one of the locations during the routine 500, querying each location is expected to identify the location of the key. The key can then be returned in response to the request at block 518, and the routine 510 can end at block 519. In some embodiments, read requests are sent in parallel. Notably, this parallel read technique would not be expected to significantly increase latency of read requests, since the query to each potential location can occur at least partly concurrently. Thus, these embodiments effectively trade the bandwidth required to query multiple locations to gain better distribution of load among the ring 10. Because the bandwidth used for such queries is generally load, this is an advantageous tradeoff in many situations, particularly in those where the cascade effect of bounded loads is detrimental. In other embodiments, queries may be sent at least partly serially. For example, the load balancer 112 may query a first location, await a response, and (if the data is not stored at the first location) query a second location, repeating for each potential location. In some instances, the query ordering may be randomized between requests to avoid consistently poor behavior for some keys. For example, utilizing a fixed sequential order of 1 through k may result in any key stored at the kth location always incurring high latency to retrieve, while any key stored at the $1^{st}$ location would always incur low latency to retrieve. By using a random order for querying the $1^{st}$-kth locations, this effect can be eliminated, and the average retrieval latency across keys can be made consistent.

Figure 6:
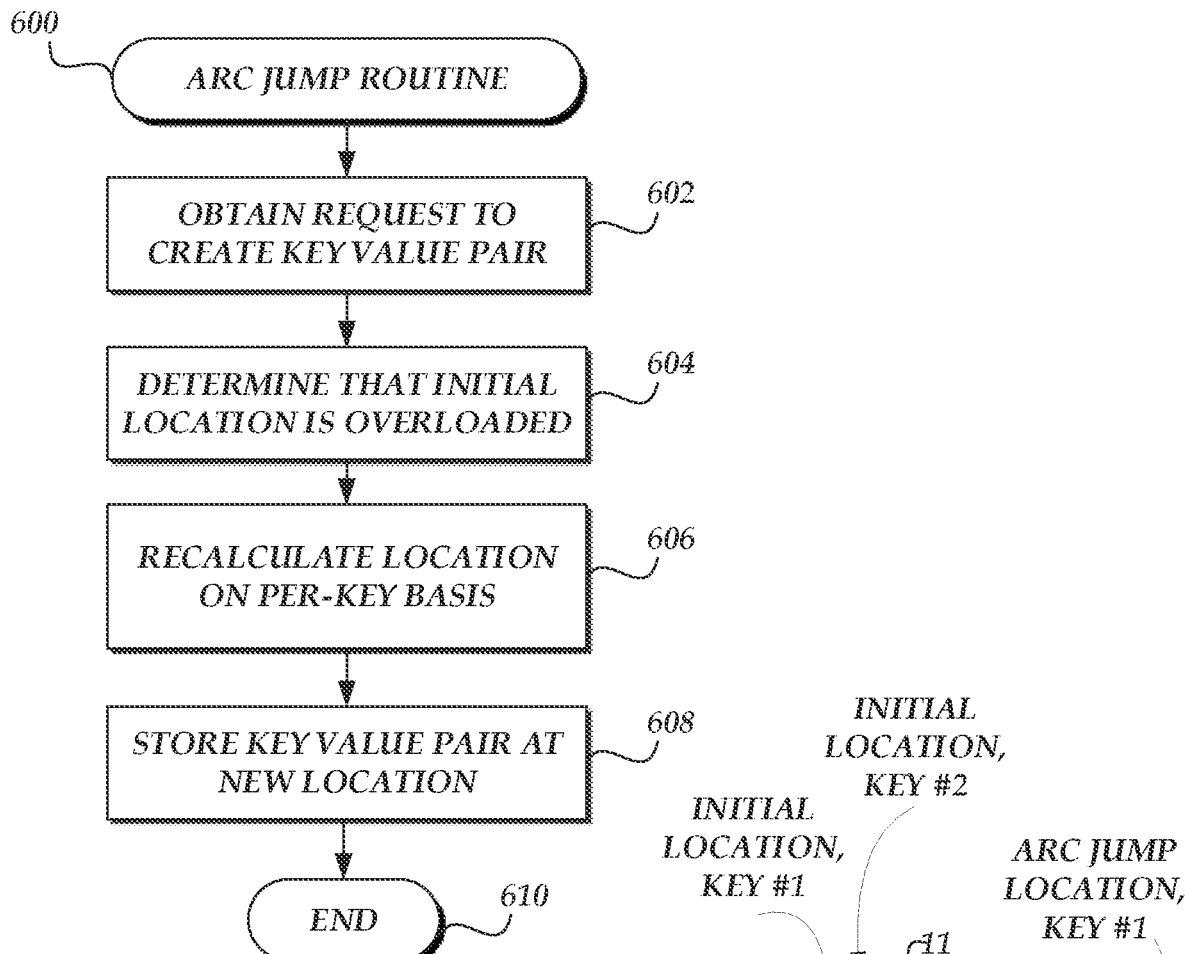
FIG. 6 is a flow chart showing an illustrative routine for handling placement of objects on a consistent hash ring when an initially selected server is overloaded, using an arc jump algorithm in accordance with embodiments of the present disclosure.
Figure 6:
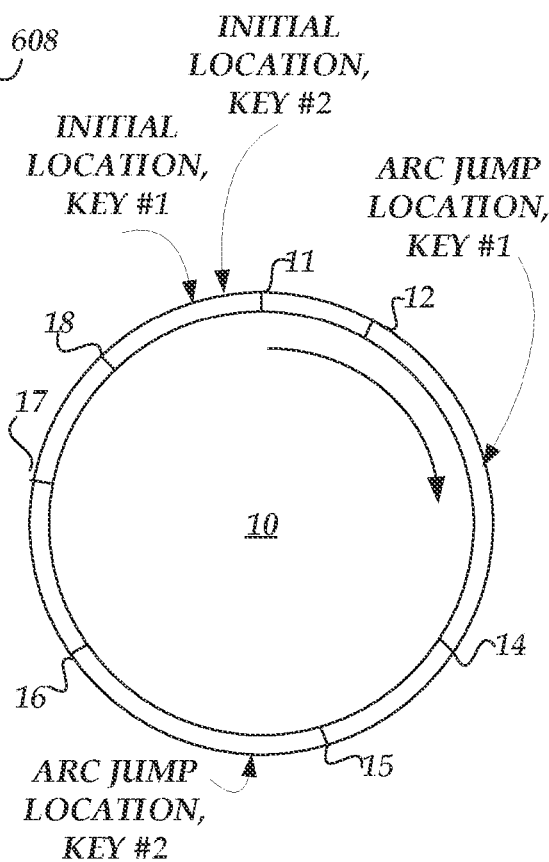

Embodiments of the present disclosure provide for an additional or alternative mechanism for avoiding cascades when implemented bounded loads, by providing for "arc jump" hashing in the instance of an overloaded server. As noted above, this technique can enable an alternative server for a key to be determined on a per-key basis, such that load of an overloaded server is distributed among all remaining servers, rather than a single adjacent server on a ring. An example routine 600 for use of this technique is shown in FIG. 6, along with a reproduction of the ring 10 of FIG. 1, for reference. The routine 600 is illustratively implemented by a load balancer 112.

The routine 600 beings at block 602, where the load balancer 112 obtains a request to create a key value pair, in a manner similar to block 502. The load balancer 112 then determines an initial placement location for the key value pair. The initial placement may be determined, for example, as a single fixed location (e.g., as a hash value of the key in accordance with a simplified consistent hash ring algorithm), or as a preferred location from among k potential locations (e.g., as described with respect to the routine 500).

At block 604, the load balancer 112 determines that the server associated with the initial location is overloaded. For example, the load balancer 112 may transmit a request to the server to store the key value pair, and obtain a response declining to store that pair. The load balancer 112 may alternatively obtain health or load information for the server indicating that the server is overloaded.

At block 606, the balancer 112 recalculates a location for the key value pair on a per-key basis, as opposed for example to simply attempting to store the pair on a next server in the ring 10. In one embodiment, recalculation can include passing the key through an alternative hash function to produce a different hash value. In another embodiment, recalculation can include seeding the key with a "retry" number or similar indication that an alternative location is being determined, and passing the seeded key through the same hash function used to determine an initial location. In still another embodiment, re-hashing (passing the first hash value through the hash function again to result in a next hash value) may be used to determine the location. The load balancer 112 then stores the key value pair at the new, recalculated location, at block 608, and the routine ends at block 610.

Due to the nature of hash functions, the recalculated positions of FIG. 6 can be expected, when calculated for many keys, to be distributed relatively evenly among the ring 10. Accordingly, when an initial server is overloaded, the "overflow" load from that server is distributed among the ring 10, rather than being concentrated on a next server on the ring 10. The effect can be seen with reference to the ring 10 of FIG. 6. Assume, for example, that two key value pairs initially hash to the same arc of the ring 10, shown in FIG. 6 as the initial locations of keys number 1 and 2. Further assume that the server associated with that arc, server 11, has become overloaded. In a simplified bounded loads algorithm, a load balancer 112 would store these keys at server 12, leading to a concentration of load at that server and an increased chance of cascades. However, under the routine 600, each of the two keys would be rehashed to result in a different hash value, corresponding to an effectively randomized location among the ring 10. For example, the alternative "arc jump" location for key #1 may be the arc corresponding to server 14, while the alternative "arc jump" location for key #2 may be the arc corresponding to server 16. Thus, overflow from server 11 is distributed, rather than concentrated, and the cascade effect is broken.

While the routine 600 of FIG. 6 is described as including two hashes (e.g., a first to select the initial server, and a second to select the alternative), the routine 600 may in some embodiments be modified to include another predetermined number of hashes. This number may be selected, for example, at random, on a per-request or per-load balancer basis. For example, a given load balancer 112 may be configured to address an overloaded server by re-hashing an initial hash two additional times (for a total of three hash calculations), with the third hash value being used to select a location on the ring 10 at which to place a key value pair. As another example, a load balancer 112 may be configured to, for each request, determine a random number up to a fixed threshold maximum, and to re-hash an initial hash a number of times equal to the random number. By calculating only a bounded set of hash values (e.g., 2 or more, up to a bounded maximum), embodiments of the present disclosure can avoid the cascade effect while requiring relatively low amounts of computing resources, which may be bounded commensurate with the maximum number of calculated hash values. This provides advantages over other techniques. For example, another possible approach may be to continuously rehash an object (e.g. its key) until a resulting hash value equals the index of a server on the ring 10 (that is, with the hash value being identical to the location of the server on the ring 10, as opposed to merely falling within an arc associated with the server). That approach—known as "random jumps" is described, for example, in "Revisiting Consistent Hashing with Bounded Loads," by Chen et al., available via Cornell University's arXiv service (arXiv: 1908.08762). While potentially effective in breaking the cascade effect, this continuous rehashing generally results in significant incurred latency and resource usage, limiting its practical use. Embodiments of the present disclosure, in contrast, provide for negation of the cascade effect without incurring the difficulties of continuous rehashing.

The benefits of the individual routines described above exist independently and are not exclusive to one another. Thus, each of the routines described above may be implemented independently, in combination with one or more other routines, or in combination with other techniques (such as "bounded loads"). For example, a load balancer 112 may implement server placement in the manner of routine 400 while also implementing data placement in the manner of the routine 500 and arc jumps in the manner or routine 600. In any such configuration, the routines described above can provide substantial improvement in existing load balancing techniques.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A load balancer for a distributed system providing a network-accessible service, the distributed system comprising a plurality of computing devices providing the network-accessible service, wherein the load balancer comprises:
    a data store storing information arranging the plurality of computing devices into a consistent hash ring, wherein each computing devices of the plurality of computing devices is mapped to a location on the consistent hash ring and assigned to service requests that are mapped to an arc of the consistent hash ring corresponding to the location; and
    a processor in communication with the data store and configured to:
        obtain a notification that an additional computing device has been added to the distributed system;
        identify a plurality of potential locations for the additional computing device on the consistent hash ring at least partly by hashing an attribute of the additional computing device multiple times, with differing seed values, to result in multiple hash values, each of the multiple hash values corresponding to a potential location of the plurality of potential locations;
        compare the plurality of potential locations to identify a preferred location that is associated with a maximum arc length among the plurality of potential locations;
        modify the consistent hash ring to map the additional computing device to the preferred location; and
        route one or more subsequent requests to the distributed system in accordance with the modified consistent hash ring.

2. The system of claim 1, wherein the attribute is an identifier of the additional computing device, and wherein the differing seed values reflect a location number among the plurality of potential locations.

3. The system of claim 1, wherein load balancer is included within a plurality of load balancers acting as a distributed load balancing system, and wherein the processor is further configured to transmit the preferred location to remaining load balancers of the distributed load balancing system.

4. The system of claim 1, wherein the processor is further configured to:
    obtain a request to store a new key value pair on the distributed system;
    identify a plurality of potential locations for the new key value pair on the consistent hash ring at least partly by calculating multiple hash values for the key, each of the multiple hash values corresponding to a potential location of the plurality of potential locations for the new key value pair;
    compare the plurality of potential locations for the new key value pair to identify a preferred location for the new key value pair among the plurality of potential locations for the new key value pair; and
    route the request to store the new key value pair to a computing device, of the plurality of computing devices, that is associated with the preferred location for the new key value pair.

5. A computer-implemented method comprising:
    arranging a plurality of computing devices, which collectively operate as a distributed system, into a consistent hash ring, wherein each computing devices of the plurality of computing devices is mapped to a location on the consistent hash ring and assigned to service requests that are mapped to an arc of the consistent hash ring corresponding to the location;
    obtaining an indication that an additional computing device is to operate within the distributed system;
    identifying a plurality of potential locations for the additional computing device on the consistent hash ring at least partly by obtaining multiple hash values for the additional computing device, each of the multiple hash values generated based at least partly on an attribute of the additional computing device;

comparing the plurality of potential locations to identify a preferred location from the plurality of potential locations; and modifying the consistent hash ring to map the additional computing device to the preferred location; and routing one or more subsequent requests to the distributed system in accordance with the modified consistent hash ring.

6. The computer-implemented method of claim 5, wherein the consistent hash ring is represented as a unit circle, and wherein locations on the unit circle are numbered according to a range of a hash function used to generate the multiple hash values.

7. The computer-implemented method of claim 5, wherein the preferred location is determined based at least in part on a comparison of one or more of arc lengths among the plurality of potential locations, loads of computing devices associated with respective locations among the plurality of locations, configurations of computing devices associated with respective locations among the plurality of locations, or an expected removal time of computing devices associated with respective locations among the plurality of locations.

8. The computer-implemented method of claim 5, wherein comparing the plurality of potential locations to identify the preferred location comprises:

assigning a score to individual locations among the plurality of potential locations;

determining that two locations from the plurality of locations are associated with equal scores; and applying a tie breaker criterion to the two locations to select the preferred location.

9. The computer-implemented method of claim 5, wherein obtaining multiple hash values for the additional computing device comprises at least one of (1) passing the attribute of the additional computing device through multiple hash functions or (2) seeding the attribute of the additional computing device with multiple seed values to result in multiple seeded attributes and passing the multiple seeded attributes through a single hash function.

10. The computer-implemented method of claim 5, wherein the method is implemented at a load balancer, and wherein the method further comprises transmitting the preferred location to at least one additional load balancer.

11. The computer-implemented method of claim 5, further comprising:

obtaining a request to store a new key value pair on the distributed system;

identifying a plurality of potential locations for the new key value pair on the consistent hash ring at least partly by calculating multiple hash values for the key, each of the multiple hash values corresponding to a potential location of the plurality of potential locations for the new key value pair;

comparing the plurality of potential locations for the new key value pair to identify a preferred location for the new key value pair among the plurality of potential locations for the new key value pair; and routing the request to store the new key value pair to a computing device, of the plurality of computing devices, that is associated with the preferred location for the new key value pair.

12. The computer-implemented method of claim 5 further comprising:

obtaining a request to store a new key value pair on the distributed system;

identifying a location for the new key value pair on the consistent hash ring at least partly by calculating a hash value for the key;

determining that a computing device, of the plurality of computing devices, that is associated with the location for the new key value pair is overloaded; and routing the request to an alternative computing device of the plurality of computing devices.

13. The computer-implemented method of claim 12 further comprising identifying the alternative computing device by recalculating the hash value for the key using an additional seed value.

14. One or more non-transitory computer-readable media comprising computer executable instructions for load balancing requests among a plurality of computing devices that collectively operate as a distributed system, wherein the instructions, when executed by a load balancer, cause the load balancer to:

arrange the plurality of computing devices into a ring, wherein each computing devices of the plurality of computing devices is mapped to a location on the ring and assigned to service requests that are mapped to an arc of the ring corresponding to the location;

obtain an indication that an additional computing device is to operate within the distributed system;

identify a plurality of potential locations for the additional computing device on the ring at least partly by obtaining multiple hash values for the additional computing device;

compare the plurality of potential locations to identify a preferred location from the plurality of potential locations;

modify the ring to map the additional computing device to the preferred location; and route one or more subsequent requests to the distributed system in accordance with the modified ring.

15. The one or more non-transitory computer-readable media of claim 14, wherein to obtain multiple hash values for the additional computing device, the instructions cause the load balancer to at least one of (1) pass an attribute of the additional computing device through multiple hash functions or (2) seed the attribute of the additional computing device with multiple seed values to result in multiple seeded attributes and pass the multiple seeded attributes through a single hash function.

16. The one or more non-transitory computer-readable media of claim 14, wherein the instructions further cause the load balancer to transmit the preferred location to at least one additional load balancer.

17. The one or more non-transitory computer-readable media of claim 14, wherein the instructions further cause the load balancer to:

obtain a request to store a new key value pair on the distributed system;

identify a plurality of potential locations for the new key value pair on the ring at least partly by calculating multiple hash values for the key, each of the multiple hash values corresponding to a potential location of the plurality of potential locations for the new key value pair;

compare the plurality of potential locations for the new key value pair to identify a preferred location for the new key value pair among the plurality of potential locations for the new key value pair; and route the request to store the new key value pair to a computing device, of the plurality of computing devices, that is associated with the preferred location for the new key value pair.

18. The one or more non-transitory computer-readable media of claim 14, wherein the instructions further cause the load balancer to:
   obtain a request to store a new key value pair on the distributed system;
   identify a location for the new key value pair on the ring at least partly by calculating a hash value for the key;
   determine that a computing device, of the plurality of computing devices, that is associated with the location for the new key value pair is overloaded; and
   route the request to an alternative computing device of the plurality of computing devices.

19. The one or more non-transitory computer-readable media of claim 18, wherein the instructions cause the load balancer to identify the alternative computing device at least partly by recalculating the hash value for the key using an additional seed value.

20. The one or more non-transitory computer-readable media of claim 18, wherein the location for the new key value pair is a preferred location from among a plurality of potential locations for the new key value pair, and wherein the instructions cause the load balancer to identify the preferred location for the new key value pair on the ring at least partly by:
   identifying the plurality of potential locations for the new key value pair on the ring at least partly by calculating multiple hash values for the key, each of the multiple hash values corresponding to a potential location of the plurality of potential locations for the new key value pair; and
   comparing the plurality of potential locations for the new key value pair to identify the preferred location for the new key value pair among the plurality of potential locations for the new key value pair.

* * * * *